US012447595B2

(12) United States Patent
Shin et al.

(10) Patent No.: US 12,447,595 B2
(45) Date of Patent: Oct. 21, 2025

(54) DEVICE FOR MOUNTING INTERIOR PARTS OF A VEHICLE

(71) Applicants: HYUNDAI MOTOR COMPANY, Seoul (KR); KIA CORPORATION, Seoul (KR); NVH KOREA, INC., Ulsan (KR)

(72) Inventors: Han Shin, Seoul (KR); Jae Won Park, Hwaseong-si (KR); Kang Ho Joo, Seoul (KR); In Tae Kim, Hwaseong-si (KR); Sun Taek Kim, Hwaseong-si (KR); Bon Min Goo, Cheonan-si (KR)

(73) Assignees: HYUNDAI MOTOR COMPANY, Seoul (KR); KIA CORPORATION, Seoul (KR); NVH KOREA, INC., Ulsan (KR)

( * ) Notice: Subject to any disclaimer, the term of this patent is extended or adjusted under 35 U.S.C. 154(b) by 360 days.

(21) Appl. No.: 17/983,461

(22) Filed: Nov. 9, 2022

(65) Prior Publication Data

US 2023/0158650 A1 May 25, 2023

(30) Foreign Application Priority Data

Nov. 23, 2021 (KR) ......................... 10-2021-0162110

(51) Int. Cl.
*B25B 27/00* (2006.01)
*B25B 27/02* (2006.01)

(52) U.S. Cl.
CPC .................................. *B25B 27/02* (2013.01)

(58) Field of Classification Search
CPC .. B25B 5/00; B25B 5/04; B25B 27/00; B25B 27/02; B60R 13/0206; B60R 21/213
See application file for complete search history.

(56) References Cited

U.S. PATENT DOCUMENTS

| | | | | |
|---|---|---|---|---|
| 6,565,116 B1 * | 5/2003 | Tajima | ................... | F16B 21/075 24/297 |
| 8,684,321 B2 * | 4/2014 | Shirakabe | ............. | F16L 3/2235 24/297 |
| 8,973,879 B2 * | 3/2015 | Kodama | ................... | H02G 3/32 248/68.1 |
| 2003/0019083 A1 | 1/2003 | Won | | |
| 2013/0009020 A1 * | 1/2013 | Shirakabe | ............. | F16L 55/035 248/74.1 |
| 2023/0392628 A1 * | 12/2023 | Berres | ................... | F16B 21/075 |

FOREIGN PATENT DOCUMENTS

| | | |
|---|---|---|
| JP | 3750788 B2 | 12/2005 |
| JP | 2015101194 A | 6/2015 |
| KR | 20030009768 A | 2/2003 |
| KR | 20180123239 A | 11/2018 |

* cited by examiner

*Primary Examiner* — Lee D Wilson
(74) *Attorney, Agent, or Firm* — Lempia Summerfield Katz LLC

(57) ABSTRACT

Disclosed is a device for mounting interior parts of a vehicle. The device includes: a base plate for a sun visor pivot arm; a clip to mount the base plate on a vehicle body panel by a rotation of a lever and a forward movement of a clip fastening/removal bar. In particular, the clip can be automatically removed from the vehicle body panel by a reverse rotation of the lever and a backward movement of the clip fastening/removal bar, thereby allowing easy installation and removal of interior parts such as the sun visor.

21 Claims, 8 Drawing Sheets

DEVICE FOR MOUNTING INTERIOR PARTS OF A VEHICLE

CROSS REFERENCE TO RELATED APPLICATION

The present application claims priority to and the benefit of Korean Patent Application No. 10-2021-0162110, filed Nov. 23, 2021, the entire contents of which are incorporated herein by reference.

BACKGROUND

Field

The present disclosure relates to a device for mounting interior parts of a vehicle and, more particularly, to a device for mounting interior parts of a vehicle, which allows interior parts such as sun visors to be detachably installed on a vehicle body panel.

Description of the Related Art

The statements in this section merely provide background information related to the present disclosure and may not constitute prior art.

A sun visor of a vehicle shields a driver's eyes from sunlight shining through the vehicle (e.g., a front windshield). The sub visor is typically rotatably mounted on the headliner of driver and front passenger seats.

In general, a pivot arm is connected to one side of the sun visor and this pivot arm is rotatably connected to a pivot arm body mounted on the vehicle body panel.

Accordingly, a user can use the sun visor while rotating the sun visor around the pivot arm in a desired direction.

As a conventional method for assembling such a sun visor, fastening the pivot arm body connected to the pivot arm to the vehicle body panel using screws or the like is mainly used. However, there is a problem in that assembly labor is required. For example, the pivot arm body is fastened to the vehicle body panel by one-point or two-point mounting of the screws by an operator using a dedicated tool, and the assembly quality may be deteriorated due to incomplete fastening during assembly.

In addition, as another conventional method for assembling the sun visor, inserting and fastening a clip mounted on the pivot arm body to the vehicle body panel is used. However, this method also has a problem that a separate dismantling operation is required to forcibly remove the clip using a dedicated tool for replacement or maintenance of the sun visor because once the clip is fastened to the vehicle body panel, it cannot be removed, and that the pivot arm body is damaged due to forced removal.

SUMMARY

The present disclosure provides a device for mounting interior parts of a vehicle. In particular, a clip for assembling a base plate for a sun visor pivot arm can be mounted on a vehicle body panel by rotation of a lever and a forward movement of a clip fastening/removal bar of the device. The clip can be automatically removed from the vehicle body panel by the reverse rotation of the lever and a backward movement of the clip fastening/removal bar, and thus the device provides easy installation and removal of interior parts such as a sun visor.

In an embodiment of the present disclosure, a device for mounting interior parts of a vehicle includes: a base plate with a first wall and a second wall dividing a sliding path with a lower opening formed facing each other on an upper surface of one side thereof, and with a pivot arm assembly hole formed on the upper surface of the other side thereof; a clip provided in a structure in which elastic fastening plates having locking jaws are formed so as to be fastened to assembly holes of a vehicle body panel; a clip fastening/removal bar provided in a structure in which pressurizing protrusions for pressurizing the elastic fastening plates are formed, and detachably inserted into the sliding path and the clip; a lever having a hinge shaft rotatably fastened to the base plate; and a push body formed on the hinge shaft of the lever to push the clip fastening/removal bar in a direction of removal.

In an embodiment of the present disclosure, a hinge hole may be formed between the sliding path and the pivot arm assembly hole so that the hinge shaft is fastened along a front-rear direction.

In an embodiment of the present disclosure, a guide jaw for guiding a linear movement of the clip fastening/removal bar may be formed between the first wall and the second wall.

In an embodiment of the present disclosure, at a rear end of the clip fastening/removal bar, a manipulation hole for manipulating the clip fastening/removal bar to be inserted along the sliding path through a lower opening of the base plate may be formed.

In an embodiment of the present disclosure, the clip may include: a front plate and a back plate on which the elastic fastening plates are formed; a top plate integrally connecting upper ends of the front plate and the back plate; and base plate support ends bent in a front-rear direction from lower ends of the front and back plates to support a bottom of the base plate.

Also, at lower ends of the elastic fastening plates, position-regulating protrusions that are closely supported on inner surfaces of the first wall and the second wall may be formed to protrude further in the front-rear direction.

In addition, on a bottom surface of the base plate, support grooves into which the base plate support ends are seated and inserted may be formed.

In an embodiment of the present disclosure, a hook may be formed to protrude from an upper surface of a front end of the lever, and a fastening jaw to which the hook is fastened may be formed at a first end of the base plate.

In an embodiment of the present disclosure, a cover for covering the clip and the hinge shaft may be fastened to a bottom of the base plate.

Also, a plurality of fastening bars having locking holes may be formed to protrude from an upper surface of the cover, and insertion holes into which the fastening bars are inserted may be formed in the base plate.

In addition, locking protrusions may be formed on outer surfaces of a first wall and a second wall formed on the base plate to be lock-inserted into the locking holes of the fastening bars.

In an embodiment of the present disclosure, the push body may include: a vertical plate integrally formed on the hinge shaft of the lever; and a pressurizing plate integrally extended from a rear end of the vertical plate to push the clip fastening/removal bar in the direction of removal when the lever rotates downward.

In order to achieve the above objective, according to another embodiment of the present disclosure, there is provided a device for mounting interior parts of a vehicle, the device including: a base plate with the first wall and the second wall dividing a sliding path with a lower opening formed facing each other on the upper surface of one side thereof, and with a pivot arm assembly hole formed on the upper surface of the other side thereof; a clip provided in a structure in which elastic fastening plates having locking jaws are formed so as to be fastened to assembly holes of a vehicle body panel; a lever rotatably fastened to the base plate; and a clip fastening/removal bar integrally formed on the upper surface of the lever, detachably inserted into the sliding path and the clip, and having pressurizing protrusions for pressurizing the elastic fastening plates on front and rear surfaces thereof.

In another embodiment of the present disclosure, a pair of hinge bars rotatably fastened to the base plate may be formed to protrude from the upper surface of the other side of the lever.

In another embodiment of the present disclosure, guide grooves may be formed between the sliding path and the pivot arm assembly hole so that the hinge bars are rotatably and movably inserted and fastened to the front and rear surfaces thereof.

In one embodiment, the guide grooves are formed to be inclined downward toward one side of the base plate.

In another embodiment of the present disclosure, the clip may include: a front plate and a back plate on which the elastic fastening plates are formed; a top plate integrally connecting upper ends of the front plate and the back plate; and base plate support ends bent in a front-rear direction from lower ends of the front and back plates to support a bottom of the base plate, and the clip is positioned between a first wall and a second wall.

Also, at lower ends of the elastic fastening plates, position-regulating protrusions that are closely supported on inner surfaces of the first wall and the second wall may be formed to protrude further in the front-rear direction.

In addition, on a bottom surface of the base plate, support grooves into which the base plate support ends are seated and inserted may be formed.

In another embodiment of the present disclosure, elastic hooks may be formed to protrude from an upper surface of a front end of the lever, and fastening jaws to which the hooks are fastened may be formed at one end of the base plate.

As described above, the device for mounting interior parts of a vehicle of the present disclosure provides the following effects.

First, the clip for assembling the base plate for the sun visor pivot arm can be easily mounted on the vehicle body panel by the rotating operation of the lever and the forward insertion operation of the clip fastening/removal bar.

Second, since the clip can be automatically removed from the vehicle body panel by the reverse rotation of the lever and the backward removal operation of the clip fastening/removal bar, maintenance and replacement of parts such as a sun visor and a pivot arm can be performed very easily.

BRIEF DESCRIPTION OF THE DRAWINGS

The above and other objectives, features, and other advantages of the present disclosure should be more clearly understood from the following detailed description when taken in conjunction with the accompanying drawings, in which.

Figure 1:
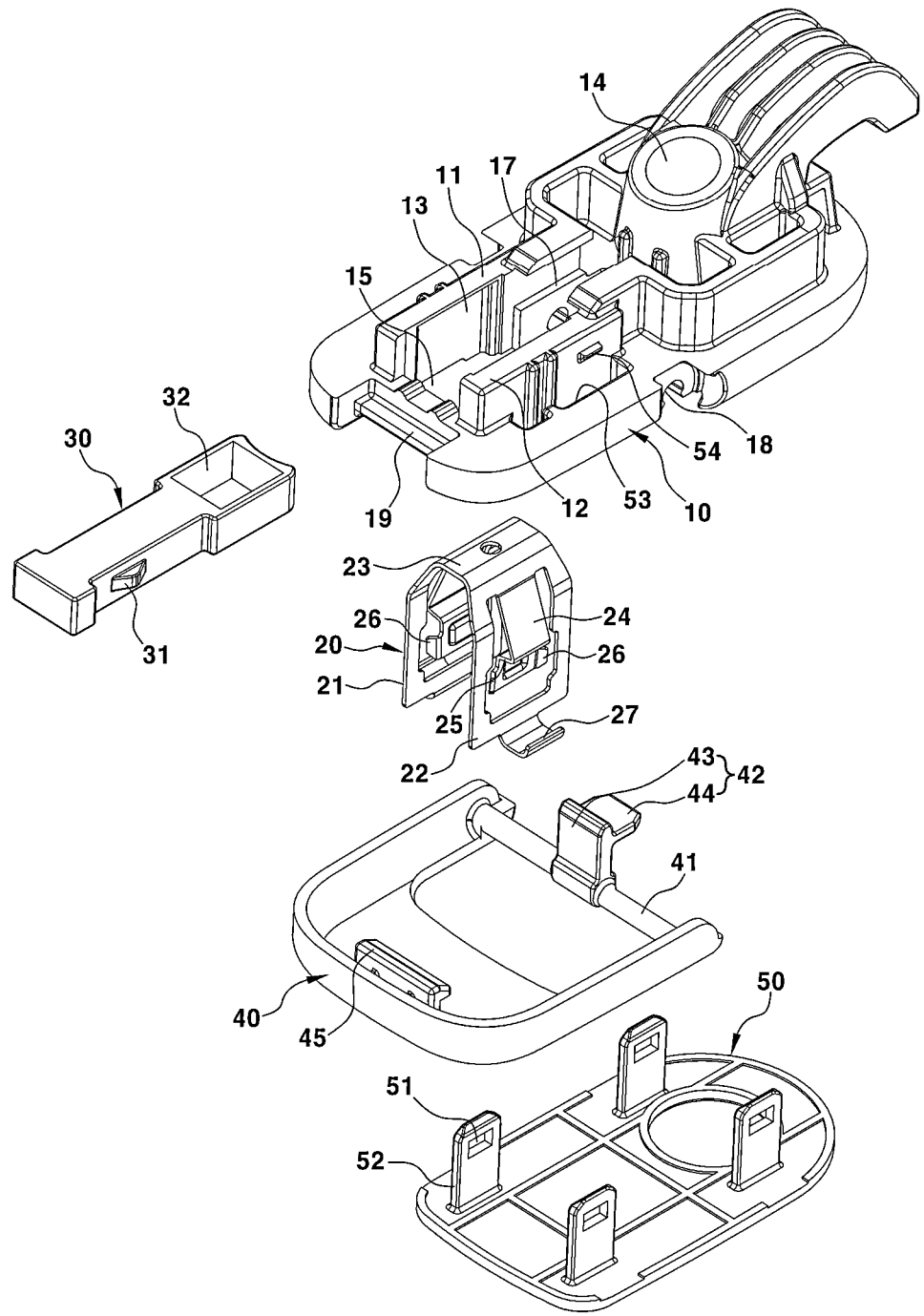
FIG. 1 is an exploded perspective view showing a device for mounting interior parts of a vehicle according to an embodiment of the present disclosure.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings. The following description is merely exemplary in nature and is not intended to limit the present disclosure, application, or uses. It should be understood that throughout the drawings, corresponding reference numerals indicate like or corresponding parts and features.

First Embodiment

Figure 2:
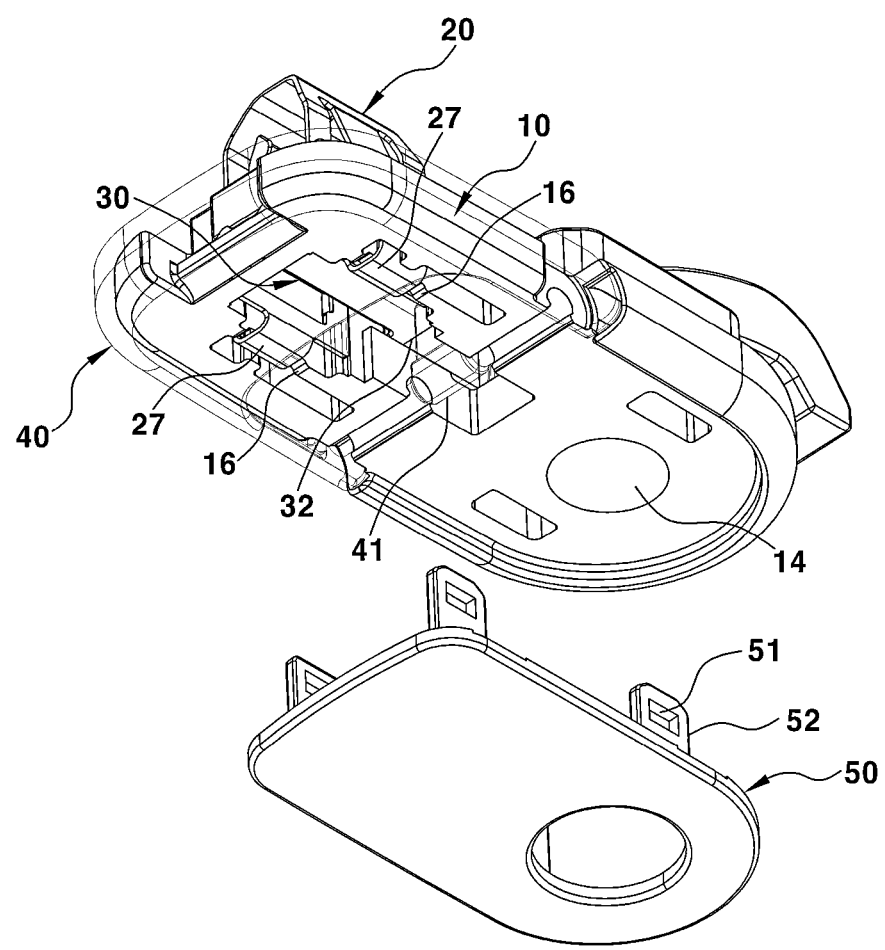
FIG. 2 is a bottom perspective view showing the device for mounting interior parts of a vehicle according to an embodiment of the present disclosure.
Figure 3:
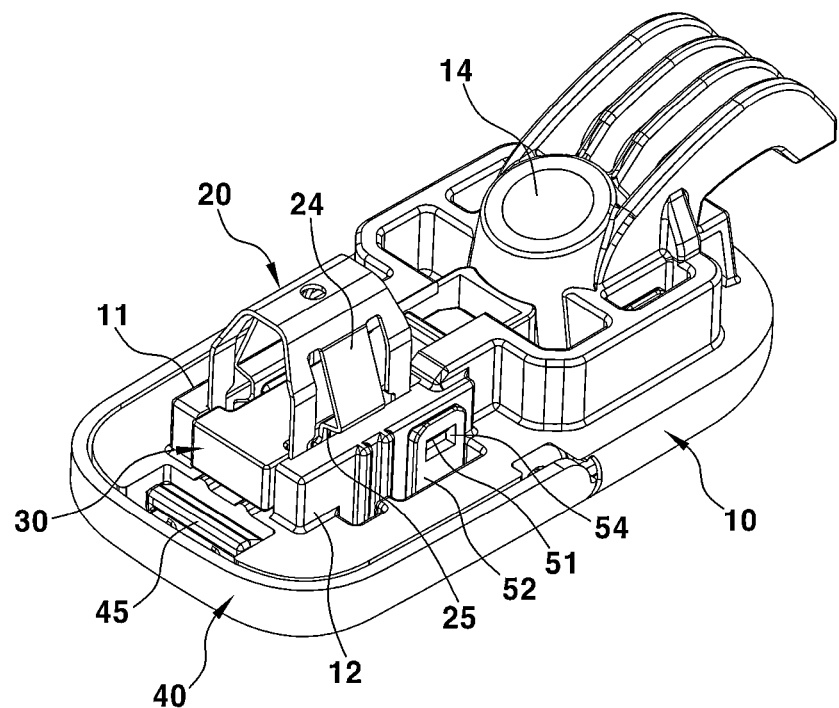
FIG. 3 is an assembled perspective view showing the device for mounting interior parts of a vehicle according to an embodiment of the present disclosure.

FIGS. 1 to 3 are perspective views showing a device for mounting interior parts of a vehicle according to an embodiment of the present disclosure, and reference numeral 10 in each drawing indicates a base plate.

The base plate 10 is a part to which a pivot arm of a sun visor is rotatably fastened. The base plate 10 is closely attached to a headliner which is a part forming an interior ceiling surface of the vehicle. The base plate 10 is provided in a structure that is fastened to a vehicle body panel inside the headliner using a clip.

To this end, the base plate 10 is provided in a structure in which the first wall 11 and the second wall 12 dividing a sliding path 13 with a lower opening are integrally formed facing each other in the front-rear direction on the upper surface of one side of the base plate, and a pivot arm assembly hole 14 is formed on the upper surface of the other side of the base plate.

Between the first wall 11 and the second wall 12, a clip 20 is positioned. The clip 20 is detachably fastened to assembly holes of the vehicle body panel while supporting the bottom of the base plate 10.

The clip 20 supports the bottom of the base plate 10, and includes elastic fastening plates 24 having locking jaws 25 to be fastened to the assembly holes of the vehicle body panel.

In one embodiment, the clip 20 includes: a front plate 21, a back plate 22, and a top plate 23 that is integrally connecting the upper ends of the front plate 21 and the back plate 22 for form a basic frame. The elastic fastening plate 24 is integrally formed on each of the front plate 21 and the back plate 22 so as to be able to spread outward. In another embodiment, base plate support ends 27 are integrally formed at lower ends of the front plate 21 and the back plate 22 to support the bottom of the base plate 10. The base plate support ends 27 are bent in the front-rear direction to support the bottom of the base plate 10.

In one embodiment, the locking jaw 25 of the elastic fastening plate 24 is formed in a bent structure to protrude outward so that it can be inserted into the assembly hole of the vehicle body panel and locked.

In one embodiment, position-regulating protrusions 26 are formed at both lower ends of the elastic fastening plate 24 of the clip 20. The position-regulating protrusions 26 are closely supported on the inner surfaces of the first wall 11 and the second wall 12 and protrude further in the front-rear direction when the elastic fastening plates 24 are spread outward.

Here, the position-regulating protrusions 26 are being closely supported on the inner surfaces of the first wall 11 and the second wall 12 when the elastic fastening plates 24 are spread outward, thereby constantly regulating a distance that the elastic fastening plate 24 spreads outwardly while limiting the vibration or shaking of the elastic fastening plate 24 in the vertical, left, and right directions by external force.

As illustrated in FIG. 2, The base plate support ends 27 of the clip 20 are inserted and seated in support grooves 16 formed on the bottom surface of the base plate 10 to support the base plate 10 after passing through the lower opening 15 of the sliding path 13 of the base plate 10.

In addition, as the base plate support ends 27 of the clip 20 are inserted and seated in the support grooves 16 of the base plate 10, it is possible to prevent contact interference with the cover 50 fastened to the lower surface of the base plate 10 and thus the cover 50 may be easily and tightly fastened to the bottom surface of the base plate 10.

Meanwhile, in the inner space of the sliding path 13 and the clip 20 of the base plate 10, a clip fastening/removal bar 30 is positioned so as to be able to move forward or backward.

In one embodiment, the clip fastening/removal bar 30 is provided with pressurizing protrusions 31 for pressurizing the elastic fastening plates 24 of the clip 20 outward. The pressurizing protrusions 31 is removably inserted into the inner space of the sliding path 13 and the clip 20.

Here, on the inner surface of the first wall 11 and the second wall 12 of the base plate 10, a guide jaw 17 for guiding the linear movement of the clip fastening/removal bar 30 is formed.

Because the clip fastening/removal bar 30 moves forward or backward with both bottom portions thereof while seated on the guide jaw 17, the clip fastening/removal bar 30 may linearly move.

Also, a manipulation hole 32 for manipulating the clip fastening/removal bar 30 to be inserted along the sliding path 13 through the lower opening 15 of the base plate 10 is formed through the top and bottom at the rear end of the clip fastening/removal bar 30.

When an operator inserts a finger or a pin tool into the manipulation hole 32 of the clip fastening/removal bar 30 through the lower opening 15 of the base plate 10 and pulls the clip fastening/removal bar 30 in the forward direction (direction of insertion), the clip fastening/removal bar 30 can be easily moved forward along the inner space of the sliding path 13 and the clip 20.

Here, when the clip fastening/removal bar 30 moves forward, the pressurizing protrusions 31 protruding from both sides of the clip fastening/removal bar 30 push the elastic fastening plates 24 of the clip 20 outward, and the locking jaws 25 of the elastic fastening plates 24 can be lock-fastened to the assembly holes of the vehicle body panel.

In one embodiment, a lever 40 having a hinge shaft 41 is rotatably fastened to the base plate 10.

In particular, a hinge hole 18 is formed between the sliding path 13 of the base plate 10 and the pivot arm assembly hole 14 so that the hinge shaft 41 is fastened along the front-rear direction.

In another embodiment, a push body 42 is formed on the hinge shaft 41 of the lever 40 to push the clip fastening/removal bar 30 in the direction of removal (backward direction).

In other embodiment, the push body 42 includes a vertical plate 43 integrally formed on the hinge shaft 41 of the lever 40, and a pressurizing plate 44 integrally extended from the rear end of the vertical plate 43 to push the clip fastening/removal bar 30 in the direction of removal (backward direction) when the lever 40 rotates downward.

In another embodiment, the push body 42 may be formed of a gear structure and other similar structures capable of pushing the clip fastening/removal bar 30 in the direction of removal while rotating together with the rotation of the hinge shaft 41 according to the downward rotation of the lever 40.

Here, a hook 45 is formed to protrude from the upper surface of the front end of the lever 40, and a fastening jaw 19 to which the hook 45 is fastened is formed at one end of the base plate 10. Accordingly, when the hook 45 is fastened to the fastening jaw 19, the lever 40 may be firmly fixed to the bottom of the base plate 10.

Meanwhile, a cover 50 for invisibly covering the clip 20 and the hinge shaft 41 is fastened to the bottom of the base plate 10.

To this end, a plurality of fastening bars 52 having locking holes 51 are formed to protrude from the upper surface of the cover 50, and insertion holes 53 are formed in the base plate 10. The fastening bars 52 are inserted into the insertion holes 53, and locking protrusions 54 are formed on the outer surfaces of the first wall 11 and the second wall 12 formed on the base plate 10 to be lock-inserted into the locking holes 51 of the fastening bars 52.

When the fastening bars 52 of the cover 50 are inserted upward through the insertion holes 53 of the base plate 10, the locking protrusions 54 are lock-inserted into the insertion holes 53 of the inserted fastening bars 52, then the cover 50 is fixed to the bottom of the base plate 10 while covering the bottom of the base plate 10.

Here, the assembling and dismounting operation of the device for mounting interior parts of a vehicle according to the first embodiment of the present disclosure having the above configuration is described as follows.

Figure 4:
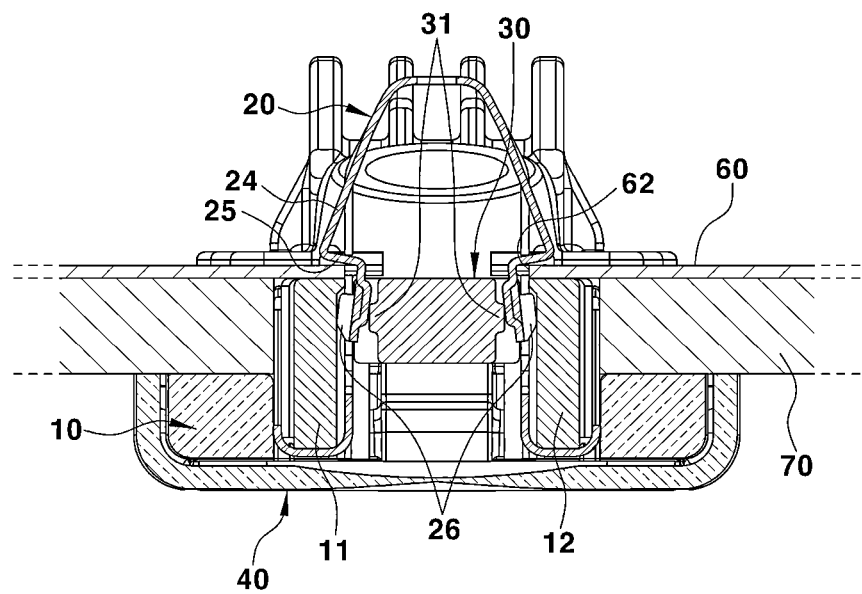
FIG. 4 is a longitudinal cross-sectional view showing a state in which a clip of the device for mounting interior parts of a vehicle is fastened to a vehicle body panel according to an embodiment of the present disclosure.

FIG. 4 is a longitudinal cross-sectional view showing a state in which a clip of the device for mounting interior parts of a vehicle is fastened to a vehicle body panel according to an embodiment of the present disclosure.

The base plate 10 is a component rotatably fastened to the pivot arm of the sun visor. Because the clip 20 is fastened to the assembly holes 62 formed in the vehicle body panel 60 inside a headliner 70, the base plate 10 may be firmly fixed to the headliner 70, which is a component constituting the interior ceiling surface of the vehicle.

To this end, the base plate 10 is brought into close contact with the headliner 70 first.

Then, when the operator inserts a finger or a pin tool into the manipulation hole 32 of the clip fastening/removal bar 30 through the lower opening 15 of the base plate 10 and pulls the clip fastening/removal bar 30 in the forward direction (direction of insertion), the clip fastening/removal bar 30 moves forward along the inner space of the sliding path 13 and the clip 20.

When the clip fastening/removal bar 30 moves forward, the pressurizing protrusions 31 protruding from both sides of the clip fastening/removal bar 30 push the elastic fastening plates 24 of the clip 20 outward, and the locking jaws 25 of the elastic fastening plates 24 may be lock-fastened to the upper outer peripheral surfaces of the assembly holes 62 of the vehicle body panel 60 as shown in FIG. 4.

Here, the position-regulating protrusions 26 of the clip 20 are being closely supported on the inner surfaces of the first wall 11 and the second wall 12, thereby constantly regulating a distance that the elastic fastening plate 24 spreads outwardly while limiting the vibration or shaking of the elastic fastening plate 24 in the vertical, left, and right directions by external force.

As such, by the base plate 10 being brought into close contact with the headliner 70, and by spreading of the elastic fastening plate 24 of the clip 20 according to the forward movement operation of the clip fastening/removal bar 30, the device for mounting interior parts of a vehicle may be easily assembled to the vehicle body panel 60.

As discussed above, the pivot arm (not shown) of the sun visor is pivotally fastened to the pivot arm assembly hole 14 formed on the other side of the base plate 10.

Also, when the base plate 10 is assembled to the vehicle body panel 60, the lever 40 may rotate in the closing direction so that the hook 45 is fastened to the fastening jaw 19, and the lever 40 comes in close contact with and fixed to the bottom of the base plate 10.

In addition, when the base plate 10 is firmly fixed to the headliner 70 due to the lock-fastening of the clip 20 to the vehicle body panel 60, by inserting the fastening bars 52 of the cover 50 upward through the insertion holes 53 of the base plate 10 and by lock-inserting the locking protrusions 54 into the locking holes 51 of the inserted fastening bars 52, the cover 50 may be fixed to the bottom of the base plate 10 while covering the bottom of the base plate 10.

Figure 5:
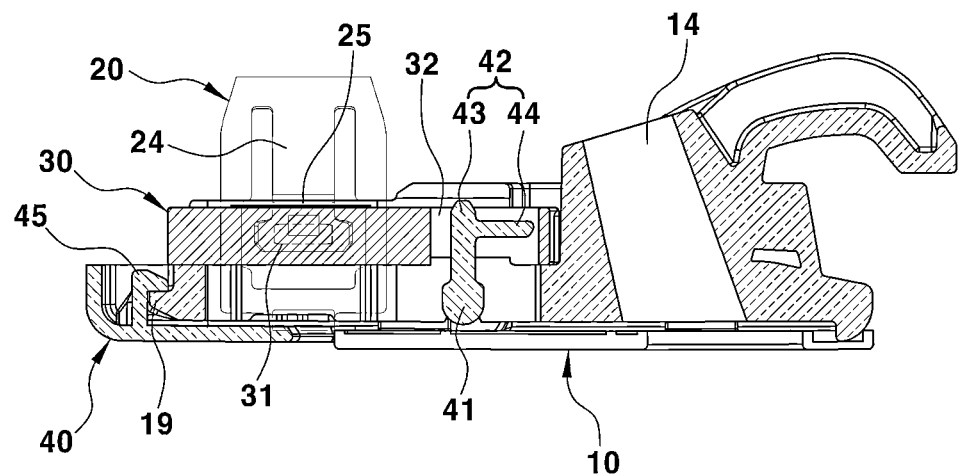
FIG. 5 is a cross-sectional view showing a state in which a clip of the device for mounting interior parts of a vehicle is fastened to a vehicle body panel according to an embodiment of the present disclosure.
Figure 6:
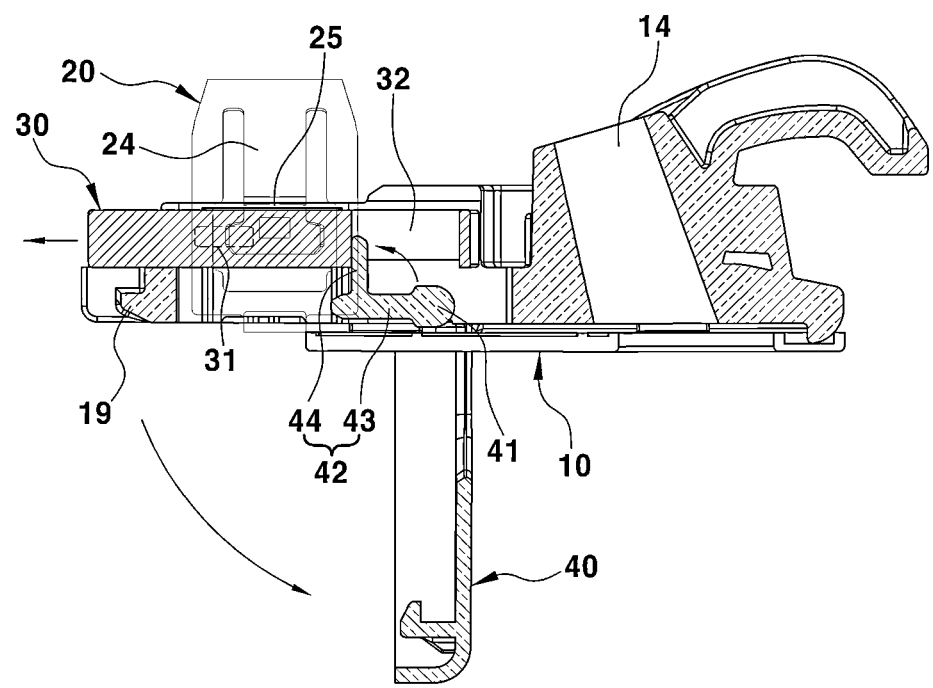
FIG. 6 is a cross-sectional view showing a state in which a clip fastening/removal bar is pushed in the direction of removal by a lever operation of the device for mounting interior parts of a vehicle according to an embodiment of the present disclosure.

FIG. 5 is a cross-sectional view showing a state in which a clip of the device for mounting interior parts of a vehicle is fastened to a vehicle body panel according to an embodiment of the present disclosure, and FIG. 6 is a cross-sectional view showing a state in which a clip fastening/removal bar is pushed in the direction of removal by a lever operation of the device for mounting interior parts of a vehicle according to an embodiment of the present disclosure.

Referring to FIGS. 5 and 6, for maintenance and replacement of parts such as a sun visor and a pivot arm, by the reverse rotation (downward rotation) of the lever 40 and the backward removal operation of the clip fastening/removal bar 30, the clip 20 may be automatically removed from the vehicle body panel 60 without the use of a separate dedicated tool.

To this end, after removing the cover 50, when the lever 40 is rotated in the downward direction the push body 42 formed on the hinge shaft 41 of the lever 40 pushes the clip fastening/removal bar 30 in the direction of removal (backward direction).

In other words, as the pressurizing plate 44 of the push body 42 integrally formed with the hinge shaft 41 of the lever 40 rotates, the clip fastening/removal bar 30 is pushed in the direction of removal (backward direction) as shown in FIG. 6.

As the clip fastening/removal bar 30 moves in the direction of removal, the pressurizing protrusions 31 protruding from both sides of the clip fastening/removal bar 30 are separated from the elastic fastening plates 24 of the clip 20, the pressing force of the pressurizing protrusions 31 is released, and thus the locking jaws 25 of the elastic fastening plates 24 are separated from the assembly holes 62 of the vehicle body panel 60 due to the elastic restoring force of the elastic fastening plates 24.

Accordingly, the clip 20 may be easily removed downwardly from the vehicle body panel 60 and the base plate 10 may also be easily removed according to the removal of the clip 20, and thus maintenance and replacement of parts such as a sun visor and a pivot arm may be performed easily.

Second Embodiment

Figure 7:
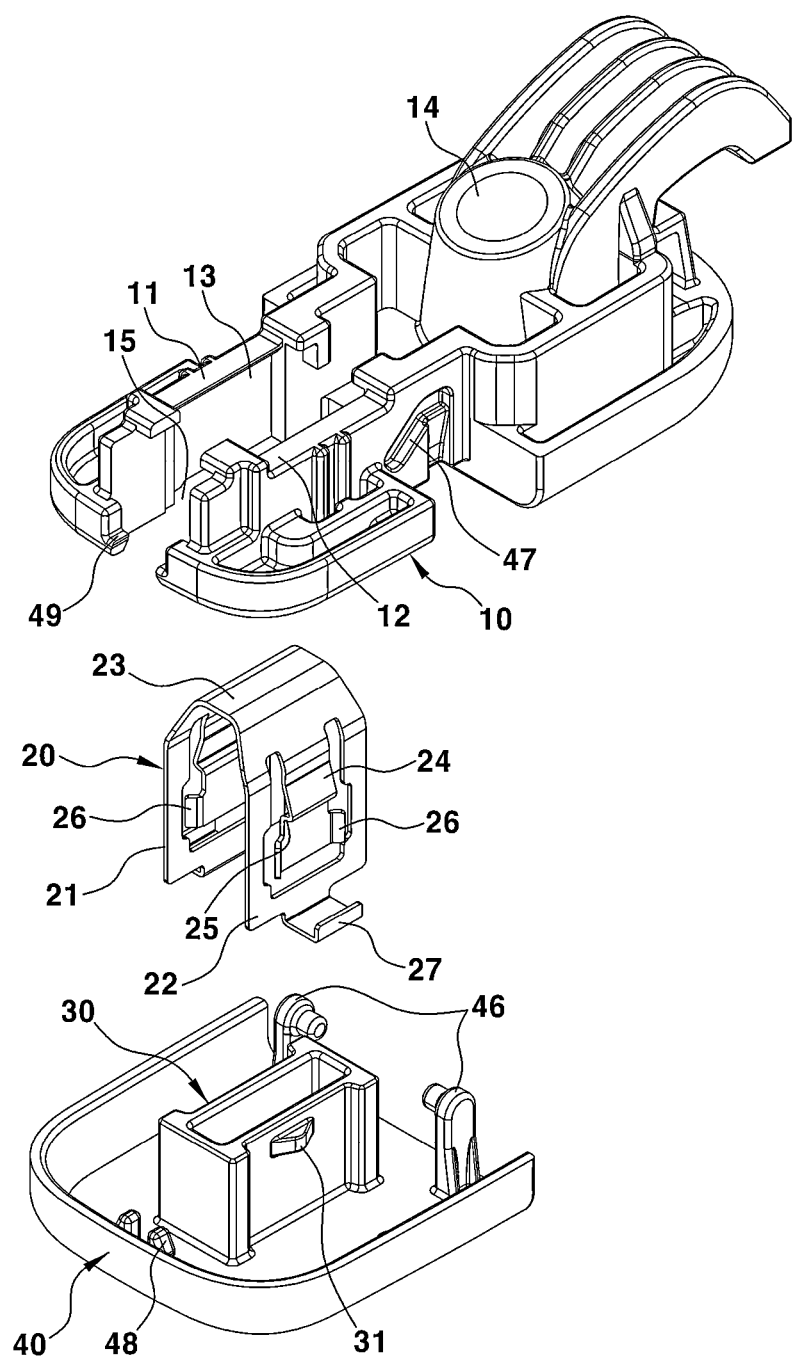
FIG. 7 is an exploded perspective view showing a device for mounting interior parts of a vehicle according to another embodiment of the present disclosure.
Figure 8:
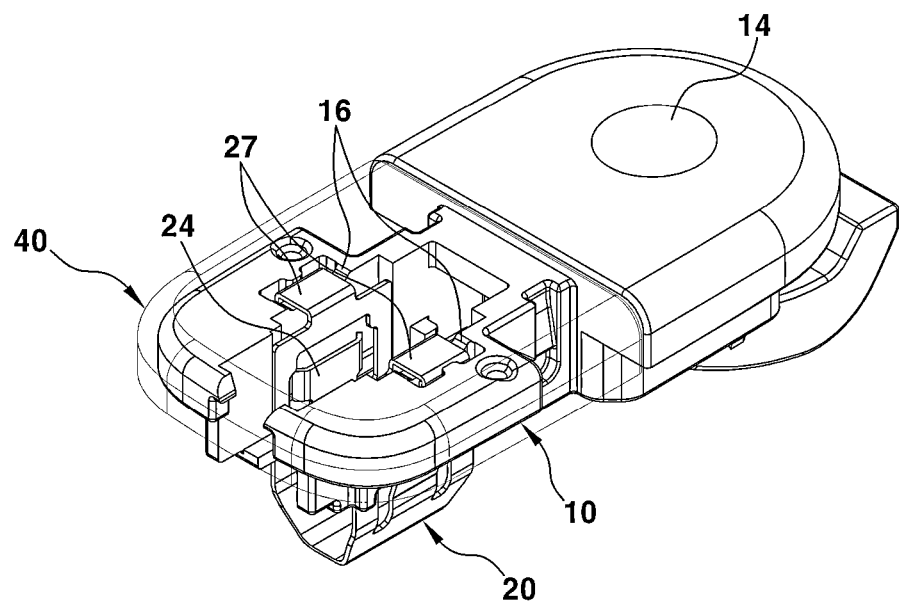
FIG. 8 is a bottom perspective view showing the device for mounting interior parts of a vehicle according to another embodiment of the present disclosure.
Figure 9:
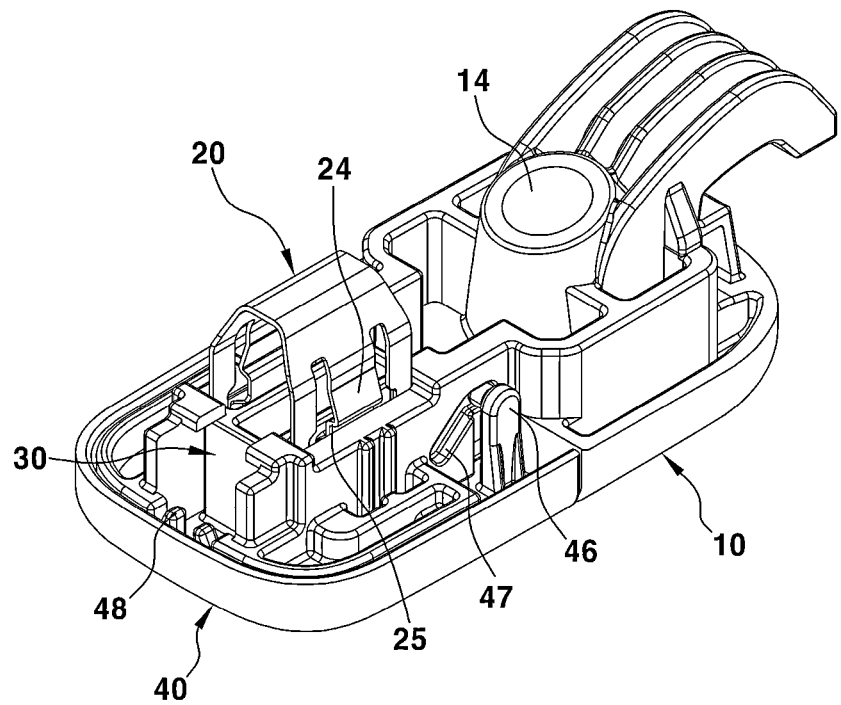
FIG. 9 is an assembled perspective view showing the device for mounting interior parts of a vehicle according to another embodiment of the present disclosure.

FIGS. 7 to 9 are perspective views showing a device for mounting interior parts of a vehicle according to another embodiment of the present disclosure, and reference numeral 10 in each drawing indicates a base plate.

The base plate 10 is a part to which a pivot arm of a sun visor is rotatably fastened. The base plate 10 is closely attached to a headliner, a part that constitutes the interior ceiling surface of a vehicle, and is provided in a structure that is fastened to a vehicle body panel inside the headliner using a clip.

To this end, the base plate 10 is provided in a structure in which the first wall 11 and the second wall 12 dividing a sliding path 13 with a lower opening are integrally formed facing each other in the front-rear direction on the upper surface of one side of the base plate, and a pivot arm assembly hole 14 is formed on the upper surface of the other side of the base plate.

Between the first wall 11 and the second wall 12, a clip 20 that is detachably fastened to assembly holes of the vehicle body panel while supporting the bottom of the base plate 10 is positioned.

To this end, the clip 20 is provided in a structure that supports the bottom of the base plate 10, and in which elastic fastening plates 24 having locking jaws 25 to be fastened to the assembly holes of the vehicle body panel are formed.

In one embodiment, the clip 20 includes: a front plate 21 and a back plate 22, and a top plate 23 that is integrally connecting the upper ends of the front plate 21 and the back plate 22 as a basic frame; the elastic fastening plate 24 integrally formed on each of the front plate 21 and the back plate 22 so as to be able to spread outward; and at the lower ends of the front plate 21 and the back plate 22, base plate support ends 27 integrally formed to support the bottom of the base plate 10 by bending in the front-rear direction.

In another embodiment, the locking jaw 25 of the elastic fastening plate 24 is formed in a bent structure to protrude outward so that it can be inserted into the assembly hole of the vehicle body panel and locked.

Also, at both lower ends of the elastic fastening plate 24 of the clip 20, position-regulating protrusions 26 that are closely supported on the inner surfaces of the first wall 11 and the second wall 12 are formed to protrude further in the front-rear direction when the elastic fastening plates 24 are spread outward.

Here, the position-regulating protrusions 26 are being closely supported on the inner surfaces of the first wall 11 and the second wall 12 when the elastic fastening plates 24 are spread outward, thereby constantly regulating the distance the elastic fastening plate 24 spreads outwardly while limiting the vibration or shaking of the elastic fastening plate 24 in the vertical, left, and right directions by external force.

In addition, the base plate support ends 27 of the clip 20, as can be seen clearly in FIG. 8, are inserted and seated in support grooves 16 formed on the bottom surface of the base plate 10 to support the base plate 10 after passing through the lower opening 15 of the sliding path 13 of the base plate 10.

Here, as the base plate support ends 27 of the clip 20 are inserted and seated in the support grooves 16 of the base plate 10, it is possible to prevent contact interference with the cover 50 fastened to the lower surface of the base plate 10 and thus the cover 50 may be easily and firmly fastened to the bottom surface of the base plate 10.

Meanwhile, a lever 40 is rotatably fastened to the base plate 10.

To this end, hinge bars 46 rotatably fastened to the base plate 10 are formed to protrude from the upper surface of the other side of the lever 40, and guide grooves 47 are formed between the sliding path 13 of the base plate 10 and the pivot arm assembly hole 14 so that the hinge bars 46 are rotatably and movably inserted and fastened to the front and rear surfaces thereof.

In one embodiment, the guide grooves 47 are formed to be inclined downward toward one side of the base plate 10.

Therefore, when the lever 40 is rotated in the downward direction, the hinge bars 46 move downward along the guide grooves 47 of the base plate 10, and the downward rotation of the lever 40 may be achieved.

In particular, a clip fastening/removal bar 30 is integrally formed on the upper surface of the lever 40. The clip fastening/removal bar 30 is detachably inserted into the inner space of the sliding path 13 and the clip 20, and has, on the front and rear surfaces thereof, pressurizing protrusions 31 pressurizing the elastic fastening plates 24 of the clip 20 outwardly.

Meanwhile, elastic hooks 48 are formed to protrude from the upper surface of the front end of the lever 40, and fastening jaws 19 to which the hooks 45 are fastened are formed at one end of the base plate 10, and accordingly, when the hooks 45 are fastened to the fastening jaws 19, the lever 40 may be firmly fixed to the bottom of the base plate 10.

Here, the assembling and dismounting operation of the device for mounting interior parts of a vehicle according to the second embodiment of the present disclosure having the above configuration is described as follows.

Figure 10:
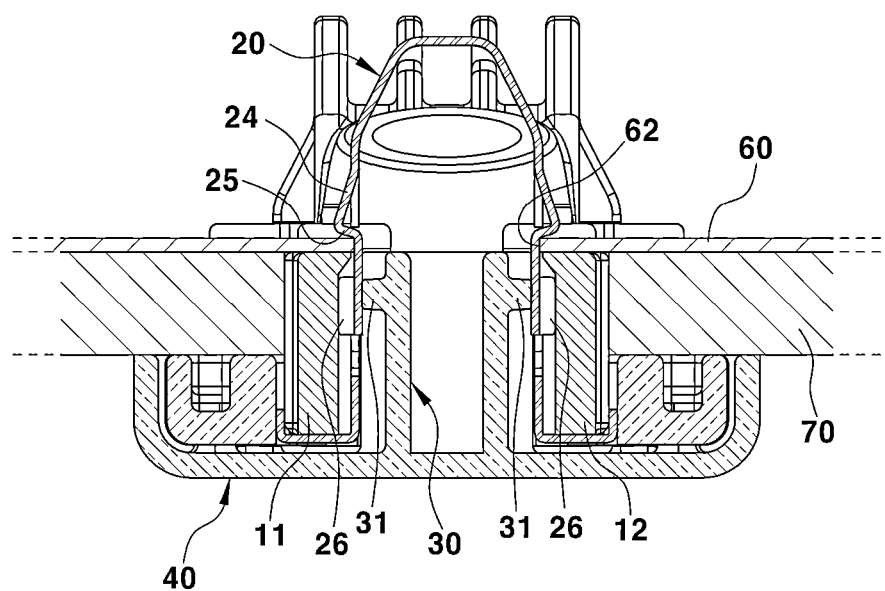
FIG. 10 is a longitudinal cross-sectional view showing a state in which a clip of the device for mounting interior parts of a vehicle is fastened to a vehicle body panel according to another embodiment of the present disclosure.

FIG. 10 is a longitudinal cross-sectional view showing a state in which a clip of the device for mounting interior parts of a vehicle is fastened to a vehicle body panel according to another embodiment of the present disclosure.

The base plate 10 is a component rotatably fastened to the pivot arm of the sun visor, and by fastening the clip 20 to the assembly holes 62 formed in the vehicle body panel 60 inside a headliner 70, the base plate 10 may be firmly fixed to the headliner 70, which is a component constituting the interior ceiling surface of the vehicle.

To this end, the base plate 10 is brought into close contact with the headliner 70 first.

Then, an operator rotates the lever 40 upward from the open position to close it.

Here, when the lever 40 is rotated upward, the hinge bars 46 move upward along the guide grooves 47 of the base plate 10 so that the lever 40 may be rotated upward.

In particular, when the lever 40 is rotated upward, the clip fastening/removal bar 30 integrally formed on the upper surface of the lever 40 enters the inner space of the sliding path 13 and the clip 20 of the base plate 10, and the pressurizing protrusions 31 push the elastic fastening plates 24 of the clip 20 outward, and thus the locking jaws 25 of the elastic fastening plates 24 may be lock-fastened to the upper outer peripheral surfaces of the assembly holes 62 as shown in FIG. 10.

Here, the position-regulating protrusions 26 of the clip 20 are being closely supported on the inner surfaces of the first wall 11 and the second wall 12, thereby constantly regulating the distance the elastic fastening plate 24 spreads outwardly while limiting the vibration or shaking of the elastic fastening plate 24 in the vertical, left, and right directions by external force.

As such, when the lever 40 rotates upward, the pressurizing protrusions 31 of the clip fastening/removal bar 30 formed on the lever 40 push the elastic fastening plates 24 of the clip 20 outward, and the locking jaws of the elastic fastening plates 24 are easily lock-fastened to the upper outer peripheral surfaces of the assembly holes 62 of the vehicle body panel 60, and thus the base plate 10 may be closely fixed to the headliner 70.

As discussed above, a pivot arm (not shown) of a sun visor is pivotally fastened to the pivot arm assembly hole 14 formed on the other side of the base plate 10.

Here, when the lever 40 is completely rotated in the closing direction, the hooks 45 are fastened to the fastening jaws 19, and the lever 40 may be firmly fixed to the bottom of the base plate 10.

Figure 11:
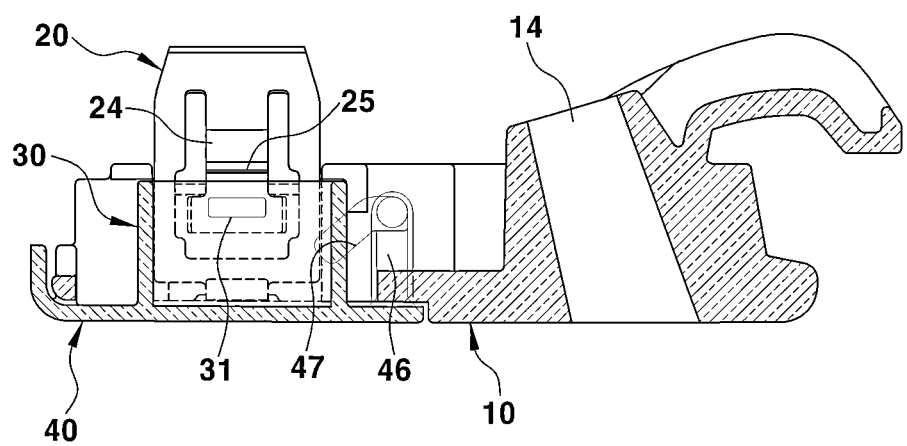
FIG. 11 is a cross-sectional view showing a state in which a clip of the device for mounting interior parts of a vehicle is fastened to a vehicle body panel according to another embodiment of the present disclosure.
Figure 12:
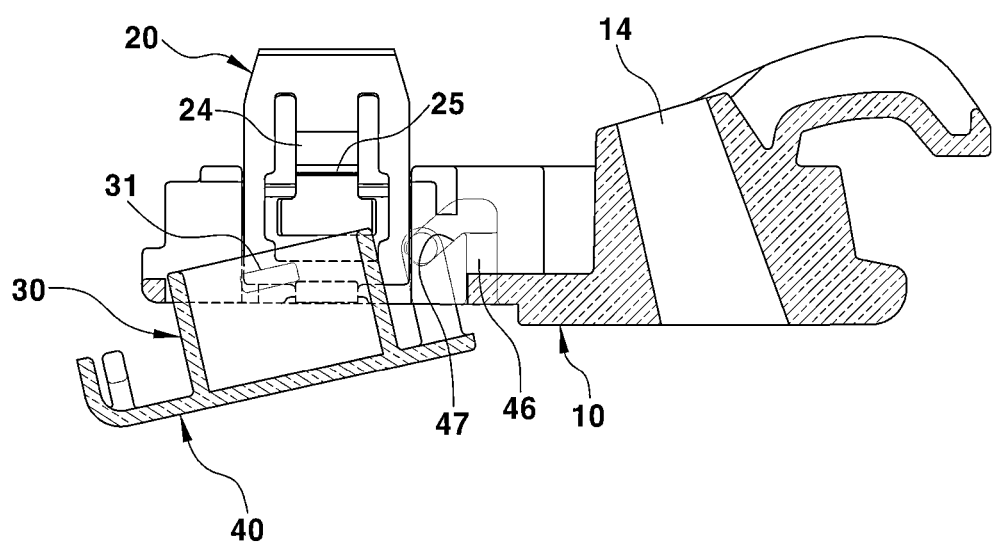
FIG. 12 is a cross-sectional view showing a state in which a clip fastening/removal bar is pushed in the direction of removal by a lever operation of the device for mounting interior parts of a vehicle according to another embodiment of the present disclosure.

FIG. 11 is a cross-sectional view showing a state in which a clip of the device for mounting interior parts of a vehicle is fastened to a vehicle body panel according to another embodiment of the present disclosure, and FIG. 12 is a cross-sectional view showing a state in which a clip fastening/removal bar is pushed in the direction of removal by a lever operation of the device for mounting interior parts of a vehicle according to another embodiment of the present disclosure.

Referring to FIGS. 11 and 12, for maintenance and replacement of parts such as a sun visor and a pivot arm, by the reverse rotation (downward rotation) of the lever 40 and the removal operation of the clip fastening/removal bar 30, the clip 20 may be automatically removed from the vehicle body panel 60 without the use of a separate dedicated tool.

To this end, when the lever 40 is rotated in the downward direction, the hinge bars 46 move downward along the guide grooves 47 of the base plate 10 and the clip fastening/removal bar 30 integrally formed on the upper surface of the lever 40 comes out of the inner space of the sliding path 13 and the clip 20 of the base plate 10 as shown in FIG. 12.

Also, as the pressurizing protrusions 31 of the clip fastening/removal bar 30 are separated from the elastic fastening plates 24 of the clip 20, the pressing force of the pressurizing protrusions 31 is released, and thus the locking jaws 25 of the elastic fastening plates 24 are separated from the assembly holes 62 of the vehicle body panel 60 due to the elastic restoring force of the elastic fastening plates 24.

Accordingly, the clip 20 may be easily removed downwardly from the vehicle body panel 60 and the base plate 10 may also be easily removed according to the removal of the clip 20, and thus maintenance and replacement of parts such as a sun visor and a pivot arm may be performed easily.

As described above, the device for mounting interior parts of a vehicle of the present disclosure has been described for the purpose of mounting the sun visor pivot arm, however, it should be noted that the device can be used for the purpose of mounting other interior parts (handle, hanger, etc.) other than the sun visor pivot arm.

Although the present disclosure has been described in detail for each embodiment above, the scope of the present disclosure is not limited to each embodiment described above, and various modifications and improvements by those having ordinary skill in the art using the basic concept of the present disclosure are also included in the scope of the present disclosure.

What is claimed is:

1. A device for mounting interior parts of a vehicle, the device comprising:
   a base plate with a sliding path formed on an upper surface thereof;
   a clip provided in a structure in which elastic fastening plates having locking jaws are formed so as to be fastened to assembly holes of a vehicle body panel;
   a clip fastening/removal bar provided in a structure in which pressurizing protrusions for pressurizing the elastic fastening plates are formed, and detachably inserted into the sliding path and the clip;
   a lever having a hinge shaft rotatably fastened to the base plate; and
   a push body formed on the hinge shaft of the lever to push the clip fastening/removal bar in a direction of removal.

2. The device of claim 1, wherein a first wall and a second wall dividing the sliding path are formed facing each other on the upper surface of a first side of the base plate, a pivot arm assembly hole is formed on the upper surface of a second side of the base plate, and a hinge hole is formed between the sliding path and the pivot arm assembly hole so that the hinge shaft is fastened along a front-rear direction.

3. The device of claim 2, wherein a guide jaw for guiding a linear movement of the clip fastening/removal bar is formed between the first wall and the second wall.

4. The device of claim 1, wherein at a rear end of the clip fastening/removal bar, a manipulation hole for manipulating the clip fastening/removal bar to be inserted along the sliding path through a lower opening of the base plate is formed.

5. The device of claim 1, wherein the clip comprises:
   a front plate and a back plate on which the elastic fastening plates are formed;
   a top plate integrally connecting upper ends of the front plate and the back plate; and
   base plate support ends bent in a front-rear direction from lower ends of the front and back plates to support a bottom of the base plate,
   wherein the clip is positioned between a first wall and a second wall.

6. The device of claim 5, wherein at lower ends of the elastic fastening plates, position-regulating protrusions that are closely supported on inner surfaces of the first wall and the second wall are formed to protrude further in the front-rear direction.

7. The device of claim 5, wherein support grooves into which the base plate support ends are seated and inserted are formed on a bottom surface of the base plate.

8. The device of claim 1, wherein a hook is formed to protrude from an upper surface of a front end of the lever, and a fastening jaw to which the hook is fastened is formed at a first end of the base plate.

9. The device of claim 1, wherein a cover for covering the clip and the hinge shaft is fastened to a bottom of the base plate.

10. The device of claim 9, wherein a plurality of fastening bars having locking holes are formed to protrude from an upper surface of the cover, and insertion holes into which the fastening bars are inserted are formed in the base plate.

11. The device of claim 10, wherein locking protrusions are formed on outer surfaces of a first wall and a second wall formed on the base plate to be lock-inserted into the locking holes of the fastening bars.

12. The device of claim 1, wherein the push body comprises: a vertical plate integrally formed on the hinge shaft of the lever; and a pressurizing plate integrally extended from a rear end of the vertical plate to push the clip fastening/removal bar in the direction of removal when the lever rotates downward.

13. A device for mounting interior parts of a vehicle, the device comprising:
   a base plate with a sliding path on an upper surface thereof;
   a clip provided in a structure in which elastic fastening plates having locking jaws are formed so as to be fastened to assembly holes of a vehicle body panel;
   a lever rotatably fastened to the base plate; and
   a clip fastening/removal bar integrally formed on the upper surface of the lever, detachably inserted into the sliding path and the clip, and having pressurizing protrusions for pressurizing the elastic fastening plates on front and rear surfaces thereof.

14. The device of claim 13, wherein a pair of hinge bars rotatably fastened to the base plate are formed to protrude from the upper surface of a second side of the lever.

15. The device of claim 14, wherein a first wall and a second wall dividing the sliding path are formed facing each other on the upper surface of a first side of the base plate, a pivot arm assembly hole is formed on the upper surface of a second side of the base plate, and guide grooves are formed between the sliding path and the pivot arm assembly hole so that the hinge bars are rotatably and movably inserted and fastened to the front and rear surfaces thereof.

16. The device of claim 15, wherein the guide grooves are formed to be inclined downward toward a first side of the base plate.

17. The device of claim 13, wherein the clip comprises:
   a front plate and a back plate on which the elastic fastening plates are formed;
   a top plate integrally connecting upper ends of the front plate and the back plate; and base plate support ends bent in a front-rear direction from lower ends of the front and back plates to support a bottom of the base plate, wherein the clip is positioned between a first wall and a second wall.

18. The device of claim 17, wherein at lower ends of the elastic fastening plates, position-regulating protrusions that are closely supported on inner surfaces of the first wall and the second wall are formed to protrude further in the front-rear direction.

19. The device of claim 18, wherein support grooves into which the base plate support ends are seated and inserted are formed on a bottom surface of the base plate.

20. The device of claim 13, wherein elastic hooks are formed to protrude from an upper surface of a front end of the lever, and fastening jaws to which the hooks are fastened are formed at a first end of the base plate.

21. A device for mounting interior parts of a vehicle, the device comprising:

a base plate with a sliding path formed on an upper surface thereof;

a clip provided in a structure in which elastic fastening plates having locking jaws are formed so as to be fastened to assembly holes of a vehicle body panel;

a clip fastening/removal bar provided in a structure in which pressurizing protrusions for pressurizing the elastic fastening plates are formed, and detachably inserted into the sliding path and the clip;

a lever having a hinge shaft rotatably fastened to the base plate; and a push body formed on the hinge shaft of the lever to push the clip fastening/removal bar in a direction of removal such that the clip is mounted on or removed from the vehicle body panel as the lever rotates and accordingly the clip fastening/removal bar moves forwards or backwards by the rotation of the push body.

* * * * *